United States Patent Office 3,549,307
Patented Dec. 22, 1970

---

3,549,307
TREATMENT OF THERMALLY STABLE SHAPED ARTICLES WITH HALIDES AND OXY-HALIDES OF GROUPS IV, V, and VI ELEMENTS
Stephen S. Hirsch, Raleigh, N.C., assignor to Monsanto Company, St. Louis, Mo., a corporation of Delaware
No Drawing. Filed Oct. 12, 1967, Ser. No. 674,735
Int. Cl. D06m 9/00
U.S. Cl. 8—115.5                     16 Claims

ABSTRACT OF THE DISCLOSURE

A process for the conversion of thermally stable shaped articles derived from wholly aromatic polyamides into dimensionally stable fireproof products which involves a constructive heat treatment at elevated temperatures in an atmosphere containing halides and/or oxy-halides of Group IV, V and VI elements under carefully controlled conditions.

BACKGROUND OF THE INVENTION

In recent years considerable research effort has been directed toward the preparation of thermally stable wholly aromatic polyamides for use in the form of films, fibers, fabrics and other shaped articles. The thermal stability requirements of polymers is constantly increasing with our advancing and more sophisticated technology. Numerous polymer compositions and chemical structures have been evaluated and the results have been published in various reports and patents. Recent efforts to further increase the thermal stability of polymers have included heat treatments to form partly or completely carbonized or graphitized fibers, replacement of some of the aromatic rings with heterocyclic rings and substitution of fluorine atoms for hydrogen atoms. However, all of these efforts have failed to achieve a polymeric product which has acceptable high molecular weight, dimensional stability, flexibility and strength together with outstanding resistance to free flames.

The process of the present invention involves the treatment of articles derived from wholly aromatic polyamides in an oxygen free atmosphere containing the halides and oxy-halides of the Group IV, V, and VI elements, resulting in fireproof products being obtained that retain dimensional stability, strength, and flexibility.

Carbonized fibers were first produced by Thomas Edison, in his search for incandescent conductive filaments. His original work was restricted to the carbonization of naturally occurring cellulosic materials; such as cotton and linen threads. With the development of flexible tungsten filaments, interest in these carbon filaments waned for a number of years.

In the late 1950's, however, a new interest arose in carbon fibers, due to a search for super refractory materials for use in ablative composites. As a result, many patents and papers describing processes for the constructive pyrolysis of materials such as various types of rayon, cellulose and acetates have issued. These patents and publications describe the preparation of essentially completely carbonized or graphitized fibers, in contrast to the organic fibers, rich in noncarbon elements, of this invention.

SUMMARY OF THE INVENTION

This invention relates to a process for the transformation of articles derived from thermally resistant aromatic polyamides by the halides and oxy-halides of the Group IV, V, and VI elements at elevated temperatures under carefully controlled conditions, into products which are fireproof, dimensionally stable at high temperatures and flexible.

It has now been found that when thermally stable aromatic polyamide compositions in the form of fibers, fabrics or other useful shaped articles having a high surface to volume ratio, are treated with the gases or vapors of the halides or oxy-halides of the Group IV, V, or VI elements with or without an inert diluent at high temperatures under carefully controlled conditions, they become partially dehydrogenated, and are transformed into fireproof, flexible, dimensionally stable products. The optimum time-temperature conditions of treatment are critical and dependent to some extent on the polymer composition. If treated below a certain temperature, the desired transformation will not occur, or occurs at too slow a rate to be practical and the product obtained will burn on exposure to flames; if heated at too high a temperature or for too long a time in the optimum temperature range, the products, although non-flammable, become embrittled and lose some of their desirable physical properties. Satisfactory time and temperature conditions for most aromatic polyamides involve raising the temperature to about 250° C. to 500° C., and when reaching the desired temperature permitting exposure to the reagent for less than one minute to about 12 hours to complete the transformation. Exposure may also take place during heating.

For example, fabrics processed within the range of conditions specified in this invention are fireproof and can withstand direct exposure to the flames of a Meker burner (1100–1200° C.) for periods of time exceeding one minute without loss of fibrous structure or dimensional form. The products are sufficiently flexible and dimensionally stable to permit use in practical applications requiring a high degree of thermal oxidative stability. In the form of fabrics the polymers of this invention are useful in electrical insulation, firewalls, non-woven structures, firefighting suits, fireproof blankets and curtains, upholstery and filling materials in automobiles, aircraft and space vehicles, composites, laminates, ablatives and other uses requiring lightweight, fireproof products. As cellular compositions they are useful in lightweight structural materials, building insulation, impact absorbing and related applications.

In addition these materials may be used in the form of paper and filters, such as for the filtration of sulphuric acid solutions, because of their chemical inertness.

Furthermore, articles produced by this process are useful as precursors for the production of fully carbonized or graphitized articles.

Accordingly, it is an object of this invention to provide a process for the transformation of thermally stable aromatic polymers into fireproof products having improved dimensional and thermal stability at elevated temperatures.

Another object of the invention is to provide a process for the prepartion of articles having an improved resistance to chemical attack, and sufficient flexibility for fabrication.

Yet another object of the invention is to provide a process for the conversion of fibers and fabrics into fireproof articles that are capable of withstanding exposure to flames of the severity of an oxygen acetylene torch for short periods of time, without loss of structural integrity or dimensional stability.

Other objects will become apparent from a consideration of the patent.

DETAILED DESCRIPTION AND PREFERRED EMBODIMENTS

In the practice of the invention the process may be applied to any of the polyamides designated in the prior art as "wholly aromatic" polyamides. These polyamides may be characterized by the recurring structural unit

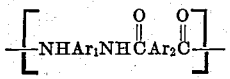

wherein $Ar_1$ and $Ar_2$ are divalent aromatic ring radicals in which the chain extending bonds connecting $Ar_1$ and $Ar_2$ to nitrogen atoms and carbonyl groups respectively are attached to a non-adjacent carbon atom. The term "aromatic ring" as used herein is intended to refer to any aromatic ring system which is of the arylene or modified arylene-heterocyclic type. The term arylene refers to single, multiple, and fused ring residues, such as phenylene, biphenylene and naphthalene.

$Ar_1$ and $Ar_2$ may be the same or different and may be an unsubstituted divalent aromatic radical or a substituted divalent radical; the substituents attached to the rings being chosen from nitro, halogen, lower alkyl groups and the like. In the above formula either one or both of the Ar groups may contain optional biphenylene linkages other than carbon-carbon, such as

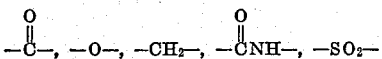

and the like. Additionally, $Ar_1$ may contain internal carbonamide linkages such as

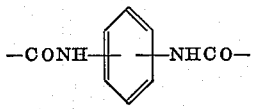

and the like.

Typical polymers of this type structure are the wholly aromatic polymers such as those disclosed in U.S. 3,063,966; 3,232,910; 3,242,213; 3,006,899 and various heterocyclic polymers such as those described in U.S. 2,895,948; 2,904,537 and 3,004,994. Others are described by Culbertson et al., J. Polymer Sci. B-4, 249 (1966). In addition, it has now been found that ordered, wholly aromatic polymers have exceptionally high thermal stability, and furthermore, that in these —AA—BB— type ordered polymers, the use of symmetrical AA and BB units results in vastly improved mechanical and thermal properties. Typical of such polymers are those described in Belgian Patents 650,774 and 660,339.

A preferred method for the preparation of these polymer compositions is by means of the low temperature solution reaction of an aromatic diamine with an aromatic diacid halide as described in numerous patents and publications. Polymers useful in the process of this invention may be prepared interfacially or in solution, following the general procedures described in the literature. These polymers may be prepared conveniently and preferably by reacting an aromatic diamine with an aromatic diacid halide in a lower alkylamide solvent such as dimethylacetamide.

Polymers useful in the practice of this invention may be converted to fibers by well known spinning techniques such as dry, wet, or dry-jet-wet spinning methods. The high melting points of most of these polymers prevents the use of melt spinning techniques. The dry spinning method is amply described in numerous patents, the dry-jet-wet spinning and wet spinning techniques useful in the preparation of fibers from these polymers are described in Belgian Patent 665,638 and U.S. Patent 3,079,219, respectively.

Fibers, films, fabrics and other shaped articles may be treated by the process described in this invention. Flameproof shaped articles, such as for example woven tapes, or fabrics may have particularly, useful application in various end uses. Fibers which have been treated by the process of this invention generally have lower elongation than the untreated samples from which they are made. Therefore, it may be desirable to weave fabrics or otherwise fabricate shaped articles from the untreated fibers and subsequently effect the fireproofing treatment. Where cellular materials are treated, the resulting product is a lightweight, fireproof rigid material.

Typical examples of the halides and oxy-halides of the Group IV, V, and VI elements, suitable for use in carrying out this invention are those such as, for example, sulfur monochloride, sulfur dichloride, sulfuryl chloride, thionyl bromide, phosgene, oxalyl chloride, trichloroacetyl chloride, phosphorus pentachloride, phosphorus oxychloride, phosphorus oxybromide, phosphorus trichloride and the like.

Products obtained by the process of this invention usually contain one or more hetero atoms. For example, when the oxidant used is sulfur monochloride, the products of the invention may contain both sulfur and chlorine. However, the achievement of non-melting and fireproof organic shaped articles by the process of this invention is not brought about merely by incorporation of hetero atoms such as sulfur and/or chlorine into the polymer. The pick-up of hetero atoms by the polymer is believed, in fact, to be largely incidental to the properties obtained. Instead, it is believed that the unexpected effect of the oxidant is the result of at least three processes. One, exposure of the polymer to the oxidant results in controlled reaction of easily oxidizable portions of the polymer molecule with the oxidant rather than the vigorous uncontrollable reaction which occurs when conventional materials are thrust into a flame. Two, the reaction of the polymer with the oxidant results in controlled crosslinking of the polymer as evidenced by diminished elongation and by insolubility. The resulting structuration of the molecules diminishes the tendency for small volatile fragments to be broken off upon being thrust into a flame, these fragments themselves burning and being observed as fire. Three, sufficient reactive sites remain on the polymer so that upon being thrust into a flame, additional crosslinking and condensation reactions occur, giving rise to carbonaceous residues of the same shape as the original article. The in situ generated carbonaceous form of the products of this invention are capable of resisting temperatures of at least 2000–3000° C. It must be noted that if high halogen content, for example, were introduced into the polymer by employment of halogenated monomers, none of the above processes would occur and at best only self-extinguishing properties would be achieved. The incorporation of covalent sulfur into the monomers likewise would not be expected to impart flame resistance.

In addition to the reactions resulting in the desired transformation it is also possible for other destructive degradation reactions to occur, which result in the breakdown of the polymer with the loss of physical structure and properties. It is probable that the type and rate of thermal decomposition reactions or processes that will occur in a given polymer during the process of this invention, are dependent on and determined by the values of energy of activation for the particular individual reactions with respect to a particular polymer structure. As a result, the optimum process conditions, minimizing the undesirable reactions, and enhancing those reactions leading to products having the superior properties attainable by the process of this invention, will vary to some extent with respect to the composition of the polymer being treated, the oxidant used, and the degree of flame resistance desired in the products.

One possible explanation of this unexpected difference in behavior by two chemically similar polymer systems on exposure to the same set of treatment conditions as described in the process of this invention will be offered. In order that the desired transformation reactions take place without substantial change in the physical structure of the polymer, it is a necessary prerequisite that these reactions begin and progress to a substantial extent at a temperature below the solftening point, or temperature at which physical changes begin to occur within the polymer. Or, expressed in a slightly different way, the threshold energy of activation values for the desired oxidation reactions must be reached at a temperature below that at which detrimental changes in the physical structure of the polymer chain occur.

On the other hand, if the polymer softens, or changes in physical structure at a temperature below that at which the oxidation reactions can take place (due to the fact that the activation energy values for reaction with reagent are not reached); other reactions leading to chain scission and polymer degradation are likely to occur in preference to the transformation reactions. In this case, the textile structure of the fibers and fabrics will be lost or so weakened during the process as to render the products obtained of little practical use.

The polymers useful in carrying out this invention are in general characterized by exceptionally high melting points and Tg values. In the practice of this invention, the conditions of time, temperature, rate of heating, and flow rates of the component gases can be varied and the set of conditions necessary to give optimum results for a given polymer system easily determined by experiment. A programmed temperature treatment may be preferred with those polymers having lower melting points or Tg values; or with those polymers in which the rate of transformation into the desired products are extremely rapid. The rate of flow of oxidant vapor is not critical and may vary from about 0.1 to about 2 cubic feet per hour for small samples. The concentration of the oxidant in the inert gas can usually be varied over a wide range; the optimum concentration being dependent upon the other reaction conditions, as well as the composition and structure of the article being treated.

In a preferred embodiment of the invention, the article is heated in a furnace under a flow of oxidant vapor-inert gas mixture. In some special cases, however, is may be preferable to preheat the article to a given temperature, prior to introduction of the oxidant vapor.

In the actual practice of this invention, the conditions of time, temperature and rate of heating can be varied and the set of conditions necessary to give optimum results for a given polymer system easily determined by experiment.

Within limits, higher treatment temperatures shorten the time required for a given degree of conversion. Time-temperature treatment conditions must be chosen for a given polymer composition and physical form, such that the rate of transformation will not occur so rapidly that the physical structure will be disrupted.

The flame resistance of tape samples treated by the process of this invention were tested using a Meker burner and an oxyacetylene torch. It was noted that a sample of treated tape which had first been exposed to a Meker burner flame for a short period of time could then be thrust into the hottest portion of an oxy-acetylene flame without being destroyed. The tape glowed white hot in the flame but retained its dimensional stability. A sample of the same tape was destroyed when thrust into the torch without prior exposure to the Meker burner flames. In almost any *real* situation exposure to fire, the flame intensity would increase gradually. The likelihood of sudden exposure to flames of the intensity of the hottest portion of an oxygen-acetylene blowtorch is extremely remote. Thrusting the sample suddenly into the Meker Flame (1200° C.) and then (with or without cooling) into the $O_2$—$C_2H_2$ Flame (3000° C.), while simulating gradual buildup of flame intensity, nevertheless represents a more severe set of conditions than those to be expected in actual practice. On exposure to a Meker burner flame, the treated tape glowed red and became embrittled; on subsequent exposure in the torch flame, the tape becomes flexible again. This would indicate that the cross-linking reactions which began in the original treatment continued in the Meker flame. The much higher temperature of the oxy-acetylene flame in all probability destroyed the crosslinks in the course of the conversion of the sample to a more graphite-like structure.

Articles, treated by the process of this invention, should be able to retain their structural integrity at higher temperaures and for longer periods of time if exposed to flames which increase in intensity over a short period of time, as would usually occur in most ordinary fires.

As one example, of a useful application of this invention, the products obtained may be used in flame resistant composite or non-woven structures. Other possible end uses for products of this invention are high temperature insulation filtration media, protective clothing, curtains and laminated structures.

Other methods for carrying out the process of this invention may be used equally as well as the flask and hot tube methods described herein. Almost any type of furnace apparatus, capable of being heated to 200–500° C. and provided with the means for treating the shaped article may be used. The two types of apparatus and the methods described herein and used in the reduction to practice are simple embodiments of the invention. The process can be readily adapted for the treatment of fiber or fabric to a continuous process in which one or more high temperature heating towers or troughs are used, and the material passed through the apparatus at a controlled rate and tension.

Other factors affecting the rate of conversion to the fireproof conditions are polymer composition and composition of the oxidant-inert gas mixture and in the case of fabrics, for example, the type of weave, denier per filament, and fabric weight or thickness. The optimum conditions to be used in the practice of this invention are dependent upon the above factors and, in addition, to the desired properties of the end product. For a given sample and set of conditions, the article will first become flame resistant, and on continued exposure will become flameproof and finally fireproof. After becoming fireproof, continued exposure will cause a progressive deterioration in the properties of the article, the rate of deterioration being dependent upon the severity of the conditions. The descriptive terms and expressions used herein in characterizing the articles of the invention are defined in the following manner.

Thus, the term "fireproof" denotes the absence of burning and melting and resistance to destruction of the article on direct exposure to hydrocarbon flames, such as from a Meker burner, for periods in excess of one minute. A fabric will retain its structural integrity initially, but will slowly be consumed on long and continued exposure to flame.

The term "flameproof" or "nonflammable" denotes that on exposure to direct flame, an initial flashoff may occur resulting in the conversion of the article to a fireproof product. Further, the article will not support combustion and will retain its structural integrity, as well as dimensional stability on exposure to flames. The dimensional stability of flameproof fabrics will not be quite as good as that of fireproof fabrics.

The term "flame-resistant" denotes that the article on direct exposure to flame will burn very slowly, in comparison to the untreated article with some loss of structural integrity, and further that it will burn only while exposed to the flame. In the case of fiber and fabric, the material will soften, fuse and burn slowly.

The term "structural integrity" denotes that the physical form (and shape) of the article will not be changed to an appreciable extent. In the case of fibers and fabrics the individual filaments will remain distinguishable under the microscope after exposure to flame. The main implication of this term is that filament fusion does not occur.

"Dimensional stability" means that the size of the shaped article does not change appreciably on exposure to flames. In the case of fabric, a one square inch piece of fabric will shrink very slowly on exposure to flame, retaining better than 90% of its original dimensions for reasonable periods of exposure.

"Flexible" means that, in the case of fibers or fabrics, the article may be bent to the desired shape for fabrication without loss of physical properties. Further, the fibers or fabrics may be flexed with only a small percentage of the individual filaments being broken.

The process described in this invention is very useful as a means for the preparation of precursors for conversion into completely carbonized or graphitized fibers. The advantage of the process of this invention as a preliminary step in the preparation of carbonized or graphitized fibers lies in the fact that the structural integrity of the fibers are maintained throughout the process which leads to graphite or carbon fibers having superior structure properties.

The invention may be illustrated by the following examples which are not intended to be limiting as to the scope or spirit of the invention.

Example I.—Treatment of poly-m-phenylene bis(m-benzamido)terephthalamide tape and yarn with sulfur monochloride Samples of tape (2 d.p.f.) and yarn were placed on glass wool in a three-neck round bottom glass reactor flask and treated with sulfur monochloride by passing nitrogen over a pool of the liquid maintained at a temperature of 74° C. The tapes and yarns were treated under various conditions of time, temperature and nitrogen flow rates, after which the yarn samples were submitted for physical property measurements and the tapes were tested for degree of flame resistance by exposure to the flames of a Meker burner or an oxy-acetylene torch.

The results obtained from this series of experiments are shown in Table I (yarn samples). The evaluation of the corresponding tape samples is then discussed.

TABLE I

| Sample No. | Temp. | Time, sec. | Flow rate, cu.ft.hr. | Den. | Ten. | Elong. | Mod. |
|---|---|---|---|---|---|---|---|
| 1 | 367 | 1,200 | 1 | 2.39 | 3.55 | 6.3 | 104 |
| 2 | 367 | 1,700 | 1 | 2.56 | 3.22 | 5.8 | 100 |
| 3 | 367 | 2,100 | 1 | 2.58 | 3.01 | 5.33 | 106 |
| 4 | 368 | 2,600 | 1 | 2.73 | 2.97 | 5.2 | 93 |
| 5 | 368 | 2,600 | 1 | 3.05 | 2.88 | 5.04 | 94 |

All of the above tape samples were adjudged to be flameproof on exposure to the flames of a Meker burner. Tape samples 3, 4 and 5 were on the verge of being flameproof (i.e. a small amount of flash off took place initially on exposure to the flames). The difference between an exposure time of 1700 and 2600 seconds was minimal. The dimensional stability and strength of these tapes was excellent.

A sample of tape, which had been treated for 2600 seconds at a nitrogen flow rate of 2.0 cu. ft. hr. had the following analysis:

| | C | H | N | Cl | S |
|---|---|---|---|---|---|
| Before treatment | 68.34 | 4.50 | 11.4 | | |
| After treatment | 63.92 | 3.16 | 10.87 | 4.04 | 5.7 |

A sample of tape, treated with $S_2Cl_2$ as described above, became red hot on direct exposure to the flames of a Meker burner, but retained its structural integrity and dimensional stability. On exposure of this sample to the flames of an oxygen acetylene torch, the tape became white hot, but still retained its structural integrity and dimensional stability. Asbestos papers and fabrics were cut through, almost immediately, on exposure to the same flame. A porcelain rod began to melt, flow and volatilize when thrust into the flame.

Zero strength measurement.—A sample of yarn (No. 3—Table I) was mounted in a vertical tube furnace containing a quartz tube. The fiber was fastened to a hook in the stopper and a 2 gm. weight tied on the other end. Both air and nitrogen were used at a flow rate of 0.4 cu. ft. hr. The temperature was programmed at a constant rate and the breaking temperature noted.

| | Nitrogen break, °C. | Air break, °C. |
|---|---|---|
| Control (untreated) | 673 | 510 |
| Treated | 978 | 540 |

The improvement in zero breaking strength by the treatment is obvious from the above results.

Example II.—Treatment of poly-m-phenylene bis(m-benzamido)terephthalamide tape and yarn with trichloromethane sulfenyl chloride A sample of tape was placed in a glass reactor apparatus and treated with $CCl_3SCl$ at 364° C. for 1500 sec. at a nitrogen flow rate of 1.0 cu. ft. hr. The liquid $CCl_3SCl$ was maintained at a temperature of 83° C.

The product was fireproof, dimensionally stable and strong.

The experiment was repeated at 365° C. for 1500 sec. using a nitrogen flow rate of 2.0 cu. ft. hr. The product, which was also fireproof, dimensionally stable, and strong was submitted for elemental analysis:

C=66.28
H=4.15
N=10.91
S=2.43
Cl=3.17

The run was repeated using a sample of fiber wrapped loosely about glass wool. The conditions for this experiment were 365° C. for 1560 seconds at a nitrogen flow rate of 1 cu. ft. hr. with the $CCl_3SCl$ being maintained at a temperature of 83° C.

The yarn had the following properties:

Den., 2.40; Ten., 3.13; Elong., 6.03; Mi, 88

A sample of tape was treated as above at 370° C. for 1000 sec. at a nitrogen flow rate of 0.5 cu. ft. hr. with the $CCl_3SCl$ being maintained at 101° C. The product obtained was black, strong, flameproof and dimensionally stable. The tape became brittle in a Meker flame, but was flexible, although weakened, in an oxyacetylene flame.

Example III.—Treatment of poly-m-phenylene bis(m-benzamido) terephthalamide tape and yarn with phosphorus pentachloride Samples of tape and yarn were placed in a glass reactor apparatus and treated with phosphorus pentachloride by passing nitrogen over the compound maintained at a given temperature by means of a tube furnace. The tapes and yarns were treated under various conditions of time, temperature and nitrogen flow rates. The temperature of the $PCl_5$ was also varied. The nitrogen flow was generally kept at a trickle until a temperature of 285° C., at which temperature the rate of flow was increased to the desired flow rate and the temperature of the oven was programmed upward to the desired value. Yarn samples were submitted for physical property measurements and the tapes were tested in the flames of a Meker burner for degree of flame resistance.

The results obtained from this series of experiments, with respect to yarn samples, are shown in Table II. The evaluation of the corresponding tape samples is then discussed.

TABLE II

| Sample No.: | $PCl_5$ T.° C. | Oven T.° C. | Time, sec. | Flow rate $N_2$, cu.ft./hr. | Den. | Ten. | Elong. | Mod. |
|---|---|---|---|---|---|---|---|---|
| 1 | 83 | 380 | 1,000 | 1.0 | 2.42 | 2.36 | 5.2 | 115 |
| 2 | 84 | 382 | 1,500 | 1.0 | 2.48 | 3.24 | 4.6 | 122 |
| 3 | 84 | 382 | 2,000 | 1.0 | 2.47 | 3.08 | 4.39 | 120 |
| 4 | 84 | 383 | 2,600 | 1.0 | 2.55 | 3.25 | 4.58 | 129 |
| 5 | 84 | 383 | 800 | 1.0 | 2.37 | 3.45 | 5.37 | 115 |
| 6 | 83 | 383 | 500 | 2.0 | 2.32 | 3.95 | 6.79 | 127 |

The samples of tape above were flameproof but not completely fireproof (i.e. small flash off on initial exposure to flame). The tapes were dimensionally stable, had excellent strength and were flexible.

Tape sample No. 1 was submitted for elemental analysis with the following results:

C=67.50
H=4.51
N=11.35
P="between 0.1 and 0.5"
Cl=2.32

Zero Strength Measurement.—A sample of yarn, treated at 385° C. for 1500 sec. at a $N_2$ flow rate of 1.5 cu. ft. hr. (with the $PCl_5$ being maintained at 94° C.), was mounted in a vertical tube furnace containing a quartz tube. The fiber was fastened to a hook on the stopper and a 2 gm. weight tied on the other end. Both air and nitrogen were used at a flow rate of 0.4 cu. ft. hr. The temperature was programmed at a constant rate and the breaking temperature noted:

| | Nitrogen break ° C. | Air break ° C. |
|---|---|---|
| Control (untreated) | 673 | 510 |
| Treated | 996 | 564 |

The improvement in zero breaking strength by the treatment is obvious from the above results.

Example IV.—Treatment of poly-m-phenylene isophthalamide with phosphorus pentachloride Samples of tape and yarn were placed in a glass reactor apparatus and treated with phosphorus pentachloride as described in Example III above. A sample of tape, derived from this polymer composition, was treated at 383° C. with $PCl_5$ (at 83° C.) at a flow rate of 1.0 cu. ft. hr. nitrogen for 1500 seconds.

The dark brown product was flameproof but not fireproof. The tape was dimensionally stable, strong, and flexible.

Example V.—Treatment of poly-m-phenylene bis(m-benzamido) terephthalamide yarn and tape with sulfur dichloride A sample of yarn was wound about glass wool and treated with sulfur dichloride at a flow rate of 1.0 cu. ft. hr. at 316° C. for a period of 2000 sec. The $SCl_2$ was maintained at room temperature. A sample of tape was treated in a similar manner. The yarn had the following properties:

Den., 2.76; Ten., 2.29; Elong., 7.20; Mod., 78

The tape was dark brown and flameproof. The tape exhibited some burning on initial exposure and the residue became crisp but retained its dimensional stability. The tape had the following analysis:

C=59.16; H=2.86; N=10.18; Cl=14.27; S=2.26

Example VI.—Treatment of poly-m-phenylene bis(m-benzamido) terephthalamide tape and yarn with phosphorus oxychloride Samples of yarn and tape were treated with phosphorus oxychloride using the procedure described in the previous example. A temperature of 393° C., a nitrogen flow rate of 1.0 cu. ft. min., and a time of 3000 seconds were used. The temperature of the $POCl_3$ was maintained at 68° C. The tape was flame resistant and burned at a slower rate than the control. Optimum conditions would require more rigorous treatment, the results would indicate.

Example VII.—Treatment of poly-m-phenylene (m-benzamido) terephthalamide tape with oxalyl chloride An 8″ piece of tape and a 20 ft. piece of yarn was placed in the reactor and the samples equilibrated at a tempearture of 383–387° C. under nitrogen. The nitrogen flow over oxalyl chloride maintained at room temperature was 2.0 cu. ft. hr. and continued for 2200 seconds. The product was black, almost fireproof and dimensionally stable. The tape was also flexible and had fair strength. The tape, which had been exposed to the flames of a Meker burner was thrust into the flames of an oxygen acetylene flame, in which it glowed white hot but retained its stability.

The treated tape had the following analysis:

C=65.71; H=3.48; N=10.62; Cl=9.16

Example VIII.—Treatment of poly-4,4′-bis(p-aminophenyl) - 2,2′ - bithiazole isophthalamide tape and yarn with sulfur monochloride A sample of tape was placed in a tube furnace and heated to 420° C. and treated with sulfur monochloride for 1 hour at a flow rate of 1.0 cu. ft. hr. The tape had achieved partial flameproofing and substantially improved dimensional stability in a Meker flame.

Yarn properties of the treated sample were:

Den., 2.94; Ten., 3.90; Elong., 3.9; Mod., 116

Example IX.—Treatment of poly-m-phenylene bis(m-benzamido) terephthalamide tape (2 d.p.f.) with thionyl chloride A sample of tape (2 d.p.f.) was placed in a glass reactor apparatus and the nitrogen flow rate adjusted to 4.0 cu. ft. hr. The thionyl chloride pool was kept at room temperature. After treatment at 376° C. for a period of 600 sec. with the thionyl chloride nitrogen mixture, a black product was obtained that was flameproof.

The elemental analysis of the tape, after treatment was as follows:

C=63.16
H=2.98
N=10.43
S=1.66
Cl=11.39

The physical properties of the yarn were as follows:

Den., 2.48; Ten., 2.48; Elong., 4.8; Mod., 93

Example X.—Treatment of poly-m-phenylene bis(m-benzamido) terephthalamide tape (2 d.p.f.) and yarn with sulfuryl chloride A sample of tape (2 d.p.f.) was placed in a glass reactor apparatus and treated with $SO_2Cl_2$ (room temperature) at 334–336° C. for a period of 1200 sec. The flow rate of nitrogen was 2.0 cu. ft./min. The dark brown tape was flameproof when exposed to a Meker burner flame. The tape had the following elemental analysis:

$$C=62.24$$
$$H=3.12$$
$$N=10.39$$
$$Cl=11.66$$
$$S=none$$

The physical properties of the yarn were as follows:

Den., 2.75; Ten., 2.31; Elong., 4.57; Mod., 80.3

Example XI.—Treatment of m-phenylene isophthalamide tape and yarn with sulfuryl chloride A sample of tape (2 d.p.f.) and yarn was placed in a glass reactor apparatus and treated with $SO_2Cl_2$, maintained at room temperature, for a period of 1200 sec. at 334–336° C. with a nitrogen flow rate of 2.0 cu. ft. hr. The dark brown tape did not ignite when exposed to a Meker burner flame.

The physical properties of the yarn were as follows:

Den., 2.19; Ten., 2.05; Elong., 7.2; Mod., 63.1

Example XII.—Treatment of poly-m-phenylene bis(m-benzamido) terephthalamide tape with trichloroacetyl chloride A sample of tape was mounted in the tube furnace and treated by passing a nitrogen flow rate of 2.0 cu. ft. hr. over trichloroacetyl chloride maintained at room temperature. The furnace was programmed to 412° C. at 7.5° C./min. and then kept at 412° C. for 610 sec. The product obtained was flame resistant but not flameproof. Further, the tape was strong, but brittle, and had reasonable dimensional stability in a Meker flame.

Example XIII.—Treatment of poly-m-phenylene bis(m-benzamido) terephthalamide tape (2 d.p.f.) with phosgene A sample of tape (2 d.p.f.) and yarn was placed in a glass reactor apparatus and treated with a mixture of phosgene (1.0 cu. ft. hr.) and nitrogen (4 cu. ft. hr.) for 3750 sec. in the temperature range of 334–337° C. The tape was flameproof when exposed in a Meker flame, and had the following analysis:

$$C=58.24$$
$$H=2.50$$
$$N=10.06$$
$$Cl=27.03$$

Example XIV.—Preparation of paper from poly-m-phenylene(m-benzamido) terephthalamide flock treated with monochloride Standard flock (prepared from drawn oriented fiber) was beaten in a Waring Blendor, and then extracted with ethanol and finally with chloroform. After drying in a vacuum oven, the flock was treated with $S_2Cl_2$ at 367° C. at a nitrogen flow rate of 2.0 cu. ft. hr. for 3600 sec. The temperature of the $S_2Cl_2$ was maintained at 74° C. The black product thus obtained was flameproof.

A paper sheet was prepared from precipitated untreated binder and the above $S_2Cl_2$ treated flock (70% binder—30% flock) using standard procedures. The paper was flexible and strong and could be folded without breaking. A control paper sample made from untreated flock (i.e. 70% binder—30% flock) caught fire, burned, and shrank on thrusting into a Meker flame. The paper prepared from treated flock also flashed for a moment when thrust into the flame but its dimensional stability was much less affected. The paper became embrittled but remained nearly flat, and of the same size as before the flame treatment.

Example XV.—Treatment of paper derived from poly-m-phenylene(m-benzamido) terephthalamide with sulfur monochloride Samples of paper of 1 mil and 4 mil (loose matrix—i.e. 30% binder—70% flock) and a regular dense paper (70% binder—30% flock) were treated with sulfur monochloride (maintained at 74° C.) at 367° C. for 1 hour at a nitrogen flow rate of 2.0 cu. ft. hr.

The loose matrix samples produced extremely flexible, black strong products, which on thrusting into the flames of a Meker burner afforded dimensionally stable products after a slight flash off.

The regular paper (i.e. 70% binder—30% flock) became somewhat brittle as a result of the treatment, but was flameproof and dimensionally stable.

Example XVI.—Continuous treatment of poly-m-phenylene-bis(m-benzamido) terephthalamide tapes by exposure to sulfur monochloride vapors at elevated temperatures 1½″ diameter, 4½ foot long electrically heated glass tube was affixed atop a 500 ml. flask half filled with sulfur monochloride. The liquid reagent temperature was maintained at 95° C. and the glass reactor tube was heated at 405° C. Nitrogen was bubbled through the sulfur monochloride at a rate of 0.6 cubic ft./hr. to carry the reagent vapors into the reactor tube. One half inch wide tapes of poly-m-phenylene bis(m-benzamido) terephthalamide tapes (made from 2 d.p.f. C.F. fiber) were drawn through the apparatus at a rate of 38″/minute. The length of pass was approximately eight feet as the tape traveled down, then up the tube.

The black product which resulted was very strong and on the verge of being fireproof (i.e. only a very slight flash resulted upon being thrust into the Meker burner flame).

Example XVII.—Braided wire insulation of sulfur monochloride treated poly-m-phenylene-bis(m-benzamido) terephthalamide fiber Hollow tube, braided wire insulation was prepared from sixteen strands of 360/180 poly-m-phenylene-bis(m-amino-benzamido) terephthalamide fiber. The finished material was fireproofed by the methods of Examples I and XVI. Eighteen gauge platinum wires were covered with this insulation, supported in frames, crossed and subjected to 20 g tension. The circuit was completed with an ohmmeter. At this point the resistance was in excess of $10^8$ ohms. A luminous gas flame of approximately 850° C. was allowed to play on the point at which the wires crossed. Loss of insulating ability was gradual, more than $10^6$ ohms resistance remaining after 20 sec. After four minutes, over $10^3$ ohms remained. On removing the flame, the resistance again jumped up to nearly $10^6$ ohms.

By comparison, untreated braided wire insulation of the same construction failed catastrophically ($<10^3$ ohms) in 5–10 sec. Under the same conditions.

The foregoing detailed description has been given for clearness of understanding only, and unnecessary limitations are not to be construed therefrom. The invention is not to be limited to the exact details shown and described since obvious modifications will occur to those skilled in the art, and any departure from the description herein that conforms to the present invention is intended to be included within the scope of the claims.

I claim:
1. A process for providing a fireproof, dimensionally stable and flexible product from a wholly aromatic polyamide shaped article, the steps which comprise:
  (1) heating said shaped article to a temperature below its softening point but sufficient to effect reaction with the vapors of an oxidant selected from the group consisting of the halides and oxy-halides of the nonmetallic elements of Groups IV, V and VI of the

Periodic Table, said temperature being within the range of 250° C. to 500° C.

(2) Causing said reaction to take place for a time sufficient to render said shaped article fireproof.

2. The process of claim 1 wherein the polyamide is poly-m-phenylene bis(m-benzamido) terephthalamide.

3. The process of claim 1 wherein the polyamide is poly-m-phenylene isophthalamide.

4. The process of claim 1 wherein the polyamide is poly - 4,4'-bis-p(aminophenyl)-2,2'-bithiazole isophthalamide.

5. The process of claim 1 wherein the oxidant is sulfur monochloride.

6. The process of claim 1 wherein the oxidant is sulfuryl chloride.

7. The process of claim 1 wherein the oxidant is trichloromethane sulfenyl chloride.

8. The process of claim 1 wherein the oxidant is phosphorus pentachloride.

9. The process of claim 1 wherein the oxidant is oxalyl chloride.

10. A fireproof product, which retains its dimensional stability in an open hydrocarbon flame for at least about ten seconds, said product being derived by reacting at a temperature of 250–500° C. a wholly aromatic polyamide shaped article with a gaseous oxidant selected from the group consisting of halides and oxyhalides of the nonmetallic elements of Groups IV, V and VI of the Periodic Table.

11. The shaped article of claim 10 in the form of a filter.

12. The shaped article of claim 10 in the form of fiber.

13. The shaped article of claim 10 in the form of fabric.

14. The shaped article of claim 10 in the form of paper.

15. The shaped article of claim 10 in the form of cellular material.

16. The shaped article of claim 10 in the form of electrical insulation.

References Cited
UNITED STATES PATENTS 3,022,190  2/1962  Feldman _____ 117—37
3,025,185  3/1962  Schmidt _____ 117—138.8

GEORGE F. LESMES, Primary Examiner

B. BETTIS, Assistant Examiner

U.S. Cl. X.R.

8—115.6, 127.5; 260—78, 2.5, 47, 65; 117—137, 138; 161—403; 162—157, 159; 117—232